United States Patent
Cheng et al.

(10) Patent No.: US 9,544,084 B2
(45) Date of Patent: Jan. 10, 2017

(54) AUTOMATIC GAIN ADJUSTMENT AND CONTROL METHOD AND DEVICE FOR ELIMINATING INTERFERENCE BETWEEN GSM AND LTE IN MSR RECEIVER

(71) Applicant: ZTE CORPORATION, Shenzhen, Guangdong Province (CN)

(72) Inventors: Junping Cheng, Shenzhen (CN); Hong Tian, Shenzhen (CN); Zhifeng Zhang, Shenzhen (CN); Tianpeng Zhang, Shenzhen (CN); Bin Liu, Shenzhen (CN); Liqun Shao, Sr., Shenzhen (CN); Gang Wang, Shenzhen (CN); Fei Yu, Shenzhen (CN); Liguo Li, Shenzhen (CN)

(73) Assignee: ZTE CORPORATION (CN)

(*) Notice: Subject to any disclaimer, the term of this patent is extended or adjusted under 35 U.S.C. 154(b) by 60 days.

(21) Appl. No.: 14/422,078

(22) PCT Filed: Jul. 19, 2013

(86) PCT No.: PCT/CN2013/079720
§ 371 (c)(1),
(2) Date: Feb. 17, 2015

(87) PCT Pub. No.: WO2013/174313
PCT Pub. Date: Nov. 28, 2013

(65) Prior Publication Data
US 2015/0222381 A1 Aug. 6, 2015

(30) Foreign Application Priority Data
Aug. 28, 2012 (CN) .......................... 2012 1 0309284

(51) Int. Cl.
*H04B 1/10* (2006.01)
*H04J 11/00* (2006.01)
(Continued)

(52) U.S. Cl.
CPC ............. *H04J 11/005* (2013.01); *H04B 1/123* (2013.01); *H04W 52/52* (2013.01); *H04W 52/243* (2013.01); *H04W 52/38* (2013.01)

(58) Field of Classification Search
None
See application file for complete search history.

(56) References Cited

U.S. PATENT DOCUMENTS 8,331,891 B2 * 12/2012 Belotserkovsky ... H03G 3/3068
455/226.1
2010/0110999 A1 5/2010 Li et al.
(Continued)

FOREIGN PATENT DOCUMENTS

CN 102231906 11/2011
CN 102355721 2/2012
(Continued)

OTHER PUBLICATIONS

International Search Report for International Patent Application No. PCT/CN2013/079720 mailed Oct. 17, 2013.
European Search Report in EP13793906.2, dated Jul. 14, 2015.

*Primary Examiner* — Lana N Le
(74) *Attorney, Agent, or Firm* — McAndrews, Held & Malloy, Ltd.

(57) ABSTRACT

The disclosure relates to an automatic gain adjustment and control method and device for eliminating the interference between the GSM and the LTE in the MSR receiver. The method comprises: in an MSP receiver, an upper threshold and a lower threshold which are used for starting up gain control function are set; the ADC power of an ADC of the MSP receiver is detected when LTE OFDM starts; the detected ADC power is compared with the upper threshold and the lower threshold respectively; and based on that the comparison result is that the ADC power is larger than the upper threshold or is smaller than the lower threshold, the gain control function of the MSP receiver is started up, and otherwise, the gain control function of the MSP receiver is not started up. The disclosure can control the LTE and GSM signal power within a certain range.

20 Claims, 2 Drawing Sheets

(51) Int. Cl.
*H04W 52/52* (2009.01)
*H04B 1/12* (2006.01)
*H04W 52/24* (2009.01)
*H04W 52/38* (2009.01)

(56) References Cited

U.S. PATENT DOCUMENTS

| | | | | |
|---|---|---|---|---|
| 2010/0195772 A1* | 8/2010 | Kodama | ............ | H04L 27/0014 375/340 |
| 2010/0284339 A1* | 11/2010 | Noh | .................... | H04L 27/2607 370/328 |
| 2011/0122860 A1* | 5/2011 | Guan | ...................... | H04L 5/003 370/343 |
| 2011/0149773 A1* | 6/2011 | Lee | ..................... | H03G 3/3078 370/252 |
| 2016/0286513 A1* | 9/2016 | Wei | .................. | H04W 56/0035 |

FOREIGN PATENT DOCUMENTS

| | | | |
|---|---|---|---|
| CN | 102355721 A | | 2/2012 |
| CN | 102355721 | * | 12/2012 |
| CN | 102821453 | | 12/2012 |
| EP | 1303053 | | 4/2003 |
| WO | 2012/015346 A1 | | 2/2012 |

\* cited by examiner

AUTOMATIC GAIN ADJUSTMENT AND CONTROL METHOD AND DEVICE FOR ELIMINATING INTERFERENCE BETWEEN GSM AND LTE IN MSR RECEIVER

CROSS-REFERENCE TO RELATED APPLICATIONS/INCORPORATION BY REFERENCE

This application is a 371 of International Patent Application No. PCT/CN2013/079720, filed. Jul. 19, 2013, entitled "AUTOMATIC GAIN ADJUSTMENT AND CONTROL METHOD AND DEVICE FOR ELIMINATING INTERFERENCE OF MSR RECEIVER GSM AND LTE", which claims priority to Chinese Patent Application No. 201210309284.3, filed Aug. 28, 2012, entitled "Method and device for regulating and controlling automatic gains for eliminating GSM (global system for mobile communication) and LTE (long term evolution) interference of MSR (multi-standard radio) receiver". The above-identified applications are hereby incorporated herein by reference in their entirety.

TECHNICAL FIELD

The disclosure relates to the field of wireless communications, including e.g., an automatic gain adjustment and control method and device for eliminating the interference between Global System for Mobile Communication (GSM) and Long-Term Evolution (LTE) in Multi-Standard Radio (MSR) receiver.

BACKGROUND

With the constant commercial use of the LTE technology, in order to support the smooth evolution from a 2G GMS network to the LTE, many manufacturers are researching a Multi-Standard Radio (MSR) base station currently. The 3GPP TS 37.104 series of protocols stipulate the anti-interference capability of a radio frequency system of an MSR base station, but do not directly define the interference between the GSM and the LTE in the MSR base station system, and it is necessary to solve the problem of the intra-system interference of the GSM and the LTE for the commercial use of the MSR technology.

In a cell, the number of activated UEs is different in every moment, and the UEs move at any moment in the whole cell, thereby rendering the power received by the base station being not a constant power. The communication of a GSM UE with the MSR base station and the communication of an LTE UE with the MSR base station are independent of one another, and therefore, the powers of the GSM UE and the LTE UE reaching the base station are also different. If a GSM signal received by the base station is too strong, an LTE signal may be blocked, leading to the reduction of the LTE traffic. Moreover, the frame structures of the LTE and the GSM are different, and as a result, an adjustment strategy of the automatic gain of a base station receiver cannot be simply adjusted according to a strategy under a single model; and if the base station follows the adjustment strategy under the single model, the damage on another mode signal may occur.

SUMMARY

An automatic gain adjustment and control method for eliminating the interference between the GSM and the LTE in MSR receiver is provided in the embodiment of the disclosure, used for solving the problem of the intra-system interference between the GSM and the LTE in MSR base station receiver in order not to influence the change of a GSM and LTE signal frequency spectrum.

A device for implementing the above-mentioned method is provided in the embodiment of the disclosure.

According to the first aspect of the disclosure, an automatic gain adjustment and control method for eliminating the interference between the GSM and the LTE in the MSR receiver is provide, the method comprises: setting, in an MSR receiver, an upper threshold and a lower threshold which are used for starting up gain control function; detecting an Analogue-to-Digital Converter (ADC) power of the ADC of the MSR receiver when LTE Orthogonal Frequency Division Multiplexing (OFDM) starts; comparing the detected ADC power with the upper threshold and the lower threshold respectively; and based on a comparison result representing that the ADC power is larger than the upper threshold or the ADC power is smaller than the lower threshold, starting up the gain control function of the MSR receiver, and otherwise, not starting up the gain control function of the MSR receiver.

Starting up the gain control function of the MSR receiver comprises: controlling a radio frequency amplifier Attenuation (ATT) and an intermediate frequency amplifier Variable Gain Amplifier (VGA) of the MSR receiver to respectively adjust their gains.

Controlling the radio frequency amplifier ATT and the intermediate frequency amplifier VGA of the MSR receiver to respectively adjust their gains comprises: based on the judging result representing that ADC power is larger than the upper threshold, controlling the ATT and the VGA to respectively reduce their gains; and based on the judging result representing that the ADC power is smaller than the lower threshold, controlling the ATT and the VGA to respectively increase their gains.

Controlling the radio frequency amplifier ATT and the intermediate frequency amplifier VGA of the MSR receiver to respectively adjust their gains further comprises: based on the judging result representing that the ADC power is larger than the upper threshold to a predefined extend, reducing a transmitting power of a transmitting terminal of the GSM or the LTE by scheduling of the GSM and the LTE.

In a period during which the gain control function of the MSR receiver is enabled, linkage compensation is performed on a GSM signal in a digital domain in an inverse proportion to the gain control of the MSR receiver.

The linkage compensation occurs in an activation GSM time slot.

Response time delay compensation is performed on a delay response, which is caused by the linkage compensation on the GSM signal, in the digital domain.

According to the second aspect of the disclosure, an automatic gain adjustment and control device for eliminating the interference between Global System for Mobile Communication (GSM) and Long-Term Evolution (LTE) in Multi-Standard Radio (MSR) receiver is provided in the embodiment of the disclosure, the divice comprises the following components configured in the MSR receiver:

a threshold setting component, configured to set an upper threshold and a lower threshold which are used for starting up gain control function;

an Analogue-to-Digital Converter (ADC) power detector, configured to detect the ADC power of the ADC of the MSR receiver when LTE Orthogonal Frequency Division Multiplexing (OFDM) starts;

a comparing component, configured to compare the detected ADC power with the upper threshold and the lower threshold respectively; and a gain control start-up component, configured to start up the gain control function of the MSR receiver according to a comparison result of the comparing component, wherein when the comparison result is that the ADC power is larger than the upper threshold or the ADC power is smaller than the lower threshold, the gain control function of the MSR receiver is started up.

The device further comprises a gain linkage compensation component located in a digital domain of the MSR receiver, configured to, in a period during which the gain control function of the MSR receiver is enabled, perform gain linkage compensation on a GSM signal in the digital domain in an inverse proportion to the gain control of the MSR receiver.

In addition, the device further comprises a response time delay compensation component located in the digital domain of the MSR receiver, configured to perform response time delay compensation on a delay response, which is caused by the linkage compensation on the GSM signal, in the digital domain.

With regard to the related art, the technical effect of the disclosure is to, by means of detecting the ADC power of the MSR receiver when LTE OFDM starts and starting up the gain control when the ADC power is larger than the upper threshold or the ADC power is smaller than the lower threshold, be able to control the LTE and GSM signal power within a certain range, thus preventing the LTE and GSM signal power from being too large or too small, thereby solving the problem that an LTE signal is blocked because a GSM signal is too large in the related art.

DETAILED DESCRIPTION OF THE EMBODIMENTS

Figure 1:
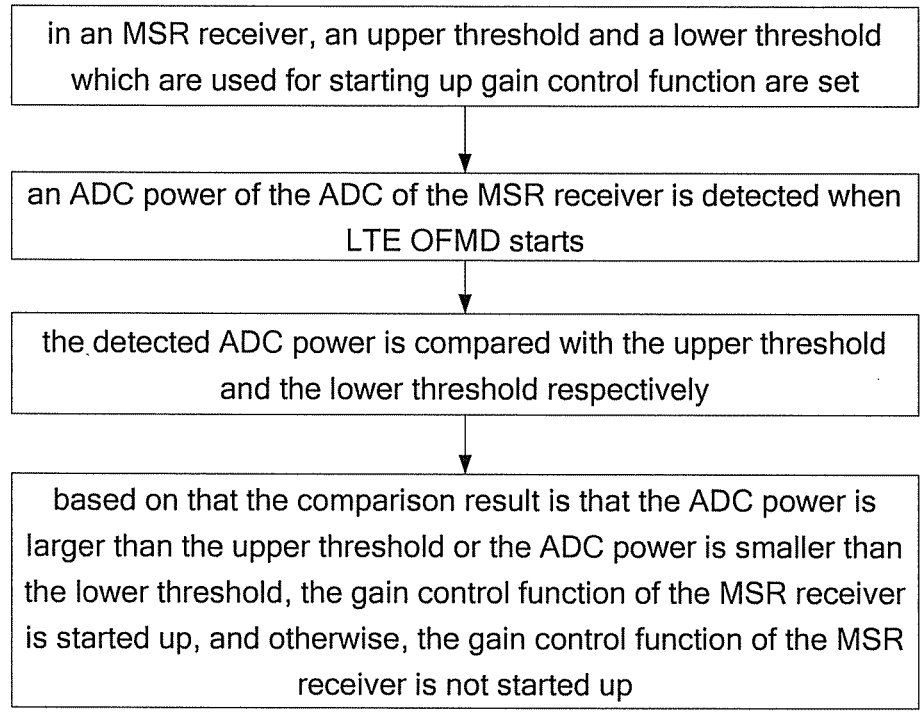
FIG. 1 is a schematic diagram of an automatic gain adjustment and control method for eliminating the interference between the GSM and the LTE in the MSR receiver of the disclosure.

FIG. 1 shows an automatic gain adjustment and control method for eliminating the interference between the GSM and the LTE in the MSR receiver of the disclosure. As shown in FIG. 1, the method comprises the following steps:

in an MSR receiver, an upper threshold and a lower threshold which are used for starting up gain control function are set;

an analogue-to-digital converter (ADC) power of the ADC of the MSR receiver is detected when LTE OFDM starts. Since a synchronous frame header CP is in an LTE OFDM symbol, the CP can be used to ensure that the power in the OFDM symbol used for baseband demodulation is constant;

the detected ADC power is compared with the upper threshold and the lower threshold respectively; and based on that the comparison result is that the ADC power is larger than the upper threshold or the ADC power is smaller than the lower threshold, the gain control function of the MSR receiver is started up, and otherwise, the gain control function of the MSR receiver is not started up.

With regard to the LTE OFDM starting time, it is determined by the MSR receiver of the disclosure by using the synchronous frame header CP of the received LTE OFMD.

The above-mentioned step of starting up the gain control function of the MSR receiver can comprise: a radio frequency amplifier ATT and an intermediate frequency amplifier VGA of the MSR receiver is controlled to respectively adjust the gains thereof. The radio frequency amplifier ATT and the intermediate frequency amplifier VGA of the MSR receiver is controlled to respectively adjust the gains thereof comprises: based on that the ADC power is larger than the upper threshold, the ATT and the VGA is controlled to respectively reduce the gains thereof; and based on that the ADC power is smaller than the lower threshold, the ATT and the VGA is controlled to respectively increase their gains.

In the above-mentioned method of the disclosure, the radio frequency amplifier ATT and the intermediate frequency amplifier VGA of the MSR receiver is controlled to respectively adjust their gains further comprises: based on that the ADC power is larger than the upper threshold to a predefined extend, the transmitting power of a transmitting terminal of the GSM or the LTE is reduced by scheduling of the GSM and the LTE. It can be implemented by reporting an event that the ADC power is too large to a high layer, and then scheduling the GSM and the LTE by the high layer.

Since a GSM frame structure and an LTE frame structure are different, the gain control adjustment based on the LTE OFDM may render that the power of the GSM in each slot is not continuous. Therefore, in the embodiment of the disclosure, in a period during which the gain control function of the MSR receiver is enabled, gain linkage compensation on a GSM signal in a digital domain is performed according to an inverse proportion relationship with the gain control thereof. That is to say, based on that the gain control is gain increase, the gain linkage compensation is gain reduction, and vice versa. The gain linkage compensation shall occur or fall in an activation GSM time slot, and the compensation is not performed in other times. The activation GSM time slot is determined by the MSR receiver according to a GSM frame header, and that is to say, when the GSM frame header is detected and the frame header is overlapped with an LTE frame header, the MSR receiver activates the GSM time slot.

Figure 4:
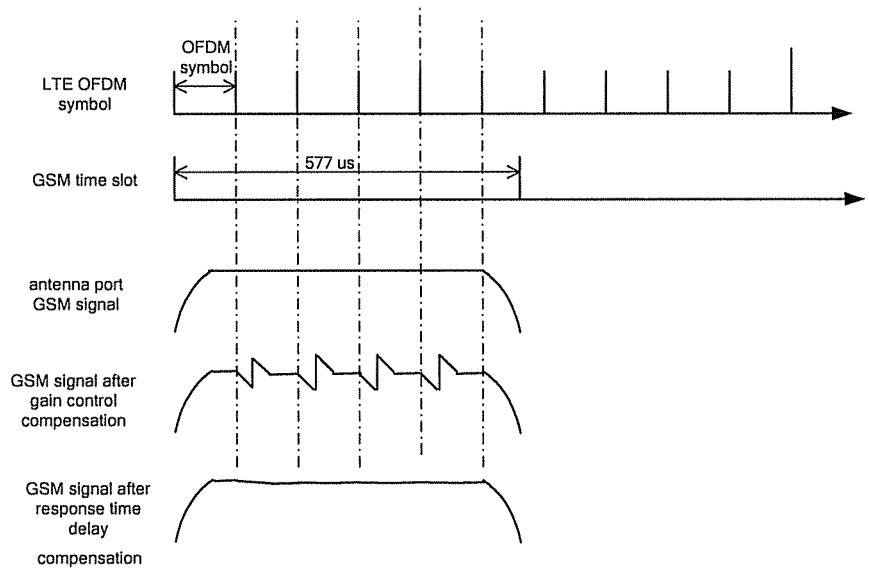
FIG. 4 is a schematic diagram used to describe the influence of gain control, gain control compensation and response time delay compensation on a GSM signal.

Since a certain delay is in the gain control itself, the waveform of the GSM signal is damaged after the gain linkage compensation is performed, as shown in FIG. 4. Therefore, in the embodiment of the disclosure, time delay compensation on a response delay which is caused by the gain control compensation on the GSM signal in the digital domain is performed.

Figure 2:
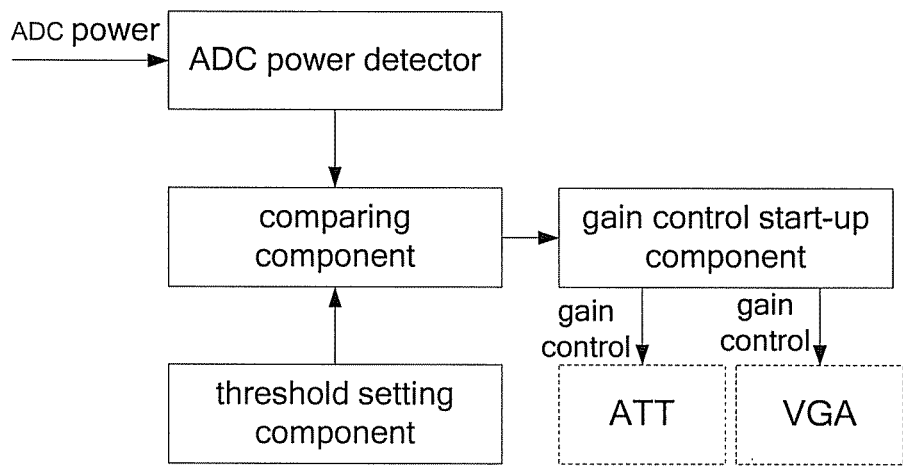
FIG. 2 is a schematic diagram of a device for implementing the method of the disclosure.

FIG. 2 shows an automatic gain adjustment and control device for eliminating the interference between the GSM and the LTE in the MSR receiver of the disclosure. As shown in FIG. 2, the device comprises the following components configured in the MSR receiver:

a threshold setting component, which is configured to set an upper threshold and a lower threshold which are used for starting up gain control function;

an ADC power detector, which is configured to detect the ADC power of an Analogue-to-Digital Converter (ADC) of the MSR receiver when LTE OFDM starts;

a comparing component, which is configured to compare the detected ADC power with the upper threshold and the lower threshold respectively; and a gain control start-up component, which is configured to start up the gain control function of the MSR receiver according to a comparison result of the comparing component, wherein when the comparison result is that the ADC power is larger than the upper threshold or the ADC power is smaller than the lower threshold, the gain control function of the MSR receiver is started up.

In addition, the device of the disclosure can further comprise a gain linkage compensation component located in a digital domain of the MSR receiver, which is configured to, in a period during which the gain control function of the MSR receiver is enabled, perform gain linkage compensation on a GSM signal in the digital domain in an inverse proportion to the gain control of the MSR receiver.

In addition, the device of the disclosure can further comprise a response time delay compensation component located in the digital domain of the MSR receiver, which is configured to perform response time delay compensation on a delay response, which is caused by the linkage compensation on the GSM signal, in the digital domain.

Figure 3:
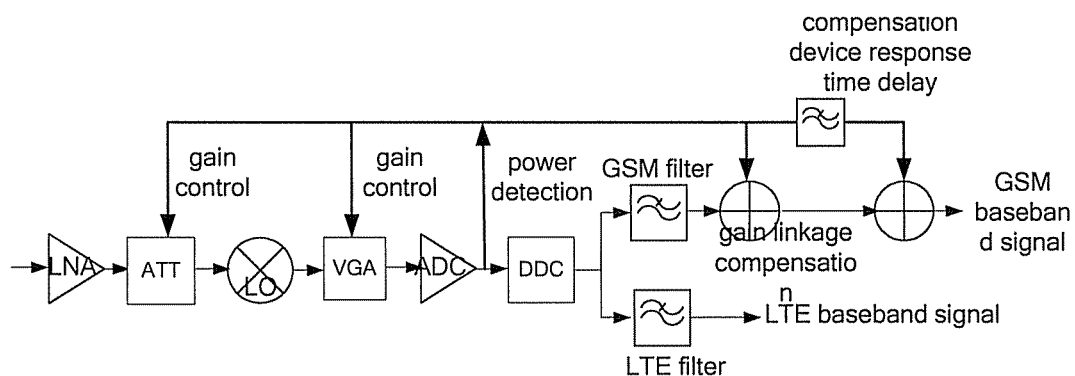
FIG. 3 is a schematic diagram of an MSR receiver used in the disclosure.

FIG. 3 shows an embodiment of an MSR receiver of the disclosure. As shown in FIG. 3, the MSR receiver comprises a low noise amplifier LNA used to amplify an LTE or GSM radio frequency signal, a radio frequency variable gain amplifier ATT, a frequency converter LO for converting a radio frequency signal into intermediate frequency, an intermediate frequency Variable Gain Amplifier (VGA), an Analogue-to-Digital Converter ADC, a low frequency converter DDC, a GSM filter, an LTE filter and a gain linkage compensation component and a digital filter acting as a response time delay compensation component.

In addition, the MSR receiver also comprises a threshold setting component, an ADC power detector, a comparing component and a gain control start-up component that are not shown in the figure, and therefore, these components in FIG. 3 are implemented via software.

The advantages of the disclosure are:

1. The problem of the intra-system interference between the GSM signals and the LTE signals in an MSR receiver is solved.

1.1 When a large signal is detected, by starting up a gain control function, it can be ensured that a GSM large signal does not influence an LTE small signal, or an LTE large signal does not influence a GSM small signal.

1.2 When a small signal is detected, by starting up the gain control function, it can be ensured that the GSM signals and the LTE signals have the gain that is large enough, thereby ensuring a demodulation threshold of a baseband.

1.3 When it is detected that the signal is too large, it is reported to a high layer, and the high layer solves the problem of the system interference by controlling the scheduling of the transmitting power of the two models.

2. The GSM demodulation may not be influenced while an LTE signal symbol-level demodulation is supported.

2.1 The complexity of the space of wireless transmission may render that the power of 14 OFDM symbols of a subframe TTI of the LTE are different; based on that the LTE signal is demodulated according to the subframe, when one of the OFDMs occurs a fault, a CRC validation error of the whole subframe may occur; and since in the embodiment of the disclosure, the LTE signal symbol-level demodulation is adopted, this problem is avoided.

2.2 By means of using the gain control adjustment and control method of the disclosure, it can be ensured that each OFDM symbol can be performed channel estimation correctly so as to improve the accuracy of signal estimation.

2.3 Since the rate of the GSM is low, AGC linkage compensation is performed in a baseband digital domain to ensure that the demodulation of the GSM is not influenced.

3. The GSM dynamic range requirement is solved.

3.1 The sensitivity requirement of the GSM is −109 dBm, and the dynamic range requirement is −15 dBm; the dynamic range thereof is nearly 100 dB; and currently, the ADC device that can be bought in the market is just 11 bit, therefore the dynamic range of the ADC is much less than the dynamic range of the GSM.

3.2 The dependency on the ADC device is greatly reduced by introducing a gain control strategy.

Although the disclosure is described above in detail, the disclosure is not limited thereto, and various modifications can be made by those skilled in the art according to the principles of the disclosure. Therefore, any modification made according to the principles of the disclosure shall be interpreted to be within the protection scope of the disclosure.

What is claimed is:

1. An automatic gain adjustment and control method for eliminating the interference between Global System for Mobile Communication (GSM) and Long-Term Evolution (LTE) in Multi-Standard Radio (MSR) receiver, comprising:
   setting, in an MSR receiver, an upper threshold and a lower threshold which are used for starting up gain control function;
   detecting an Analogue-to-Digital Converter (ADC) power of an ADC of the MSR receiver when LTE Orthogonal Frequency Division Multiplexing (OFDM) starts, wherein an LTE OFDM starting time is determined by using a synchronous frame header (CP) of a received LTE OFDM symbol;
   comparing the detected ADC power with the upper threshold and the lower threshold respectively; and
   based on a comparison result representing that the ADC power is larger than the upper threshold or the ADC power is smaller than the lower threshold, starting up the gain control function of the MSR receiver, and otherwise, not starting up the gain control function of the MSR receiver.

2. The method according to claim 1, wherein starting up the gain control function of the MSR receiver comprises: controlling a radio frequency amplifier and an intermediate frequency amplifier of the MSR receiver to respectively adjust their gains.

3. The method according to claim 2, wherein controlling the radio frequency amplifier ATT and the intermediate frequency amplifier VGA of the MSR receiver to respectively adjust their gains comprises:
   based on the judging result representing that the ADC power is larger than the upper threshold, controlling the ATT and the VGA to respectively reduce their gains; and
   based on the judging result representing that the ADC power is smaller than the lower threshold, controlling the ATT and the VGA to respectively increase their gains.

4. The method according to claim 3, wherein controlling the radio frequency amplifier ATT and the intermediate frequency amplifier VGA of the MSR receiver to respectively adjust their gains further comprises: based on the judging result representing that the ADC power is larger than the upper threshold to a predefined extend, reducing a transmitting power of a transmitting terminal of the GSM or the LTE by scheduling the GSM and the LTE.

5. The method according to claim 4, wherein in a period during which the gain control function of the MSR receiver is enabled, linkage compensation is performed on a GSM signal in a digital domain in an inverse proportion to the gain control of the MSR receiver.

6. The method according to claim 5, wherein the linkage compensation occurs in an activated GSM time slot.

7. The method according to claim 5, wherein response time delay compensation is performed on a delay response, which is caused by the linkage compensation on the GSM signal, in the digital domain.

8. The method according to claim 3, wherein in a period during which the gain control function of the MSR receiver is enabled, linkage compensation is performed on a GSM signal in a digital domain in an inverse proportion to the gain control of the MSR receiver.

9. The method according to claim 8, wherein the linkage compensation occurs in an activated GSM time slot.

10. The method according to claim 8, wherein response time delay compensation is performed on a delay response, which is caused by the linkage compensation on the GSM signal, in the digital domain.

11. The method according to claim 2, wherein the radio frequency amplifier is an Attenuation (ATT), or the intermediate frequency amplifier is a Variable Gain Amplifier (VGA).

12. The method according to claim 2, wherein in a period during which the gain control function of the MSR receiver is enabled, linkage compensation is performed on a GSM signal in a digital domain in an inverse proportion to the gain control of the MSR receiver.

13. The method according to claim 12, wherein the linkage compensation occurs in an activated GSM time slot.

14. The method according to claim 12, wherein response time delay compensation is performed on a delay response, which is caused by the linkage compensation on the GSM signal, in the digital domain.

15. The method according to claim 1, wherein in a period during which the gain control function of the MSR receiver is enabled, linkage compensation is performed on a GSM signal in a digital domain in an inverse proportion to the gain control of the MSR receiver.

16. The method according to claim 15, wherein the linkage compensation occurs in an activated GSM time slot.

17. The method according to claim 15, wherein response time delay compensation is performed on a delay response, which is caused by the linkage compensation on the GSM signal, in the digital domain.

18. An automatic gain adjustment and control device for eliminating the interference between Global System for Mobile Communication (GSM) and Long-Term Evolution (LTE) in Multi-Standard Radio (MSR) receiver, comprising the following components configured in the MSR receiver:
a threshold setting component, configured to set an upper threshold and a lower threshold which are used for starting up gain control function;
an Analogue-to-Digital Converter (ADC) power detector, configured to detect the ADC power of the ADC of the MSR receiver when LTE Orthogonal Frequency Division Multiplexing (OFDM) starts, wherein an LTE OFDM starting time is determined by using a synchronous frame header (CP) of a received LTE OFDM symbol;
a comparing component, configured to compare the detected ADC power with the upper threshold and the lower threshold respectively; and
a gain control start-up component, configured to start up the gain control function of the MSR receiver according to a comparison result of the comparing component, wherein when the comparison result is that the ADC power is larger than the upper threshold or the ADC power is smaller than the lower threshold, the gain control function of the MSR receiver is started up.

19. The device according to claim 18, wherein the device further comprises a gain linkage compensation component located in a digital domain of the MSR receiver, configured to, in a period during which the gain control function of the MSR receiver is enabled, perform gain linkage compensation on a GSM signal in the digital domain in an inverse proportion to the gain control of the MSR receiver.

20. The device according to claim 19, wherein the device further comprises a response time delay compensation component located in the digital domain of the MSR receiver, configured to perform response time delay compensation on a delay response, which is caused by the linkage compensation on the GSM signal, in the digital domain.

* * * * *